United States Patent [19]

Umehara et al.

[11] Patent Number: 4,790,280

[45] Date of Patent: Dec. 13, 1988

[54] IGNITION APPARATUS

[75] Inventors: Kazuhiro Umehara; Toshiya Kataoka, both of Hamamatsu, Japan

[73] Assignee: Suzuki Jidosha Kogyo Kabushiki Kaisha, Hamana, Japan

[21] Appl. No.: 89,482

[22] Filed: Aug. 25, 1987

[30] Foreign Application Priority Data

Aug. 26, 1986 [JP] Japan .................... 61-200418

[51] Int. Cl.$^4$ .................................... F02P 5/145
[52] U.S. Cl. .................... 123/422; 123/423; 123/424
[58] Field of Search ................ 123/422, 423, 424, 421

[56] References Cited

U.S. PATENT DOCUMENTS

| 4,442,813 | 4/1984 | Nagase et al. | 123/424 |
| 4,570,595 | 2/1986 | Andreasson | 123/418 |
| 4,633,834 | 1/1987 | Takeuchi et al. | 123/424 |

FOREIGN PATENT DOCUMENTS 58-57071  4/1983  Japan ..................... 123/422

Primary Examiner—Andrew M. Dolinar
Attorney, Agent, or Firm—Flynn, Thiel, Boutell & Tanis

[57] ABSTRACT

An ignition apparatus has an electrically controlled spark advance mechanism. It includes first ignition signal output circuit to output a first ignition timing signal with a predetermined spark advance synchronously with engine rotation, a second ignition signal output circuit to output for trolling a second ignition timing signal delayed by a predetermined crankshaft angle from the first ignition timing signal, a spark advance operating circuit to perform an arithmetic operation based on the first ignition timing signal and to output a third ignition timing signal which advances or delays the ignition timing as engine speed increases or decreases, a first ignition timing setting circuit which uses the first ignition timing signal for ignition timing for a predetermined time after the start of the engine and which thereafter uses the second ignition timing signal; and a second ignition timing setting circuit which, when the engine is accelerated before the predetermined time elapses, uses the third ignition timing signal for ignition timing.

4 Claims, 6 Drawing Sheets

IGNITION APPARATUS

FIELD OF THE INVENTION

The present invention relates to an ignition apparatus for use in an engine and, more particularly, to an ignition apparatus having a spark advance control mechanism to change an ignition timing on the basis of an electrical control.

BACKGROUND OF THE INVENTION

Hitherto, as a spark advance mechanism in an ignition apparatus, a mechanism of the mechanical type which changes the ignition timing by mechanically moving the position of the magnet stator has generally been used. However, the mechanical type spark advance mechanism is complicated and has a slide portion, so that there is a problem of durability.

To eliminate this problem, and electrical spark advance apparatus to electrically change the ignition timing has been proposed. As the simplest electrical spark advance apparatus, an apparatus to merely change the ignition timing in a manner interlocked with the rotational speed of the engine has been known. However, this apparatus has a drawback of starting performance because the ignition timing is delayed for the longest time at the start of the engine (when the engine has the lowest rotational speed).

On the other hand, an electrical spark advance control mechanism to advance the ignition timing only at the start of the engine from the ignition timing in the stationary state has been disclosed in JP-A No. 60-195378. FIG. 1 shows a schematic diagram of such a conventional electrical spark advance control mechanism. FIG. 1 shows a contactless ignition apparatus of the capacitor discharge type which is constituted in a manner such that an output of a capacitor charging coil 1 is rectified via a diode 4 and charges a capacitor 5, and a spark for ignition is generated from a spark plug 7 by a high voltage which is developed in a secondary coil 3b when the charges from capacitor 5 are discharged through a thyristor 6 and a primary coil 3a of an ignition coil 3. According to this type of apparatus, a signal supply circuit section B which supplies an ignition signal to the thyristor 6 can advance the supply timing of the ignition signal from a set timing in accordance with a spark advance signal from a spark advance circuit section S (1) when the engine starts, (2) when the engine temperature is low, or (3) when the engine speed is low.

The above contactless ignition apparatus will now be further described in detail. A pulser coil 2 which operates synchronously with the rotation of the engine is provided. Output pulses of the pulser coil 2 are transmitted through a waveform shaping circuit 11 and supplied as ignition signals to the thyristor 6. Thus, the thyristor 6 is turned on and allows a spark for ignition to be generated from the ignition coil 3. In this case, a rotational speed detecting circuit E is simultaneously made operative by the supply of the output pulses from the pulser coil 2. The rotational speed of the engine is detected from the pulses of the pulser coil 2, thereby making operative a control circuit 15 of the signal supply circuit B. As practically shown in FIG. 2, the control circuit 15 defines the spark advance characteristic so as to change in accordance with the engine speed the ignition position or spark timing to the ignition coil 3 when the engine speed is above a predetermined speed $N_2$.

Further, a starter switch 16 to drive a starter relay 20 to supply a current to a starter motor 19 is provided.

The operation of the starter switch 16 is detected by a starter operation detecting circuit C. The detecting circuit C has a control function such that the ignition timing is set to the spark advance position when the starter motor 19 operates. Practically speaking, the starter operation detecting circuit C maintains the ignition timing at the spark advance position by extending a set time of a timer (provided in the engine temperature detecting circuit D) by only an operating time T when the engine is cold as shown in FIG. 3 in accordance with the engine temperature detected by the engine temperature detecting circuit D. Thus, the starting performance of the ignition apparatus is improved.

When the engine speed and the ignition timing were simply functionally interlocked in the electrical spark advance control mechanism, the ignition timing was delayed with the longest time at the start of the engine when the engine speed was low, so that there is a problem of starting performance.

On the other hand, in the conventional techniques described in FIGS. 1 to 3, when the engine temperature is low just after the start of the engine, the timer is operated for a predetermined period of time in response to a start signal generated upon actuation of the starter motor 19. For the period of time when the timer is operating, the control circuit 15 of the signal supply circuit B is set to ON, thereby advancing the supply timing of the ignition signal from the set position.

However, in such a case, when the engine speed is increased during the operation of the timer in order to set the engine operating mode into the running mode, the ignition timing just described becomes abnormally early. Therefore, the pressure in the cylinder rises to a value above the allowable limit and in the worst case, there is a fear of trouble such as a hole being formed in the piston. Accordingly, the foregoing conventional ignition apparatus has a problem in that the engine speed must be accelerated only after certainly confirming the elapse of the set time of the timer.

On the other hand, in the case of interlocking the ignition timing with the engine speed, the set rotational speed detected by the speed detecting circuit E cannot be set to a high speed corresponding to a trolling rotational speed. Therefore, for example, in the outboard engine or the like which does not have a starter motor and is manually started, the foregoing method by the timer cannot be used. After the start of the engine, the ignition timing is soon returned to the timing in the stationary state. Therefore, there is a problem in that the rotation durability after the start of the engine when the engine is cold deteriorates.

Further, according to the method whereby the ignition timing and the engine speed are interlocked, even in the case of promptly accelerating, the ignition timing is advanced only after the engine speed actually increases, so that the accelerating performance cannot be generally improved.

Further, according to this method, the ignition timing is not delayed unless and until the engine speed actually decreases at the time of deceleration. Therefore, the decelerating performance is bad and there is also a case where the rotational speed does not decrease at all.

SUMMARY OF THE INVENTION

The present invention is made to improve the foregoing inconveniences of the conventional apparatuses and it is an object of the invention to provide an ignition apparatus having an ignition timing controlled so that the starting characteristic is improved, so that the operating mode can be smoothly shifted to the trolling mode after the start of the engine, and so that, just after the start of the engine, the engine speed can be smoothly accelerated without abnormally raising the spark advance position to determine the ignition timing.

According to the invention, this object is accomplished by an ignition apparatus comprising: first ignition signal output means for outputting a first ignition timing signal having a predetermined spark advance synchronously with the rotation of an engine; second ignition signal output means for outputting, as a signal for trolling, a second ignition timing signal which is delayed by a predetermined crankshaft angle from the output signal from the first ignition signal output means; a spark advance operating circuit for performing an arithmetic operation on the basis of the output of the first ignition signal output means and for outputting a third ignition timing signal to specify an advance or delay of the ignition timing in correspondence to an increase or decrease in the rotational speed of the engine; first ignition timing setting means for using the first ignition timing signal as a signal to set an ignition timing for a predetermined period of time after the start of the engine and for switching and using the second ignition timing signal as a signal to set the ignition timing after the elapse of the predetermined period of time; and second ignition timing setting means which is immediately made operative when the engine is accelerated before the elapse of the predetermined period of time after the start of the engine for switching to use of the third ignition timing signal as a signal to set the ignition timing.

The above and other objects and features of the present invention will become apparent from the following detailed description and the appended claims with reference to the accompanying drawings.

DETAILED DESCRIPTION

An embodiment where the present invention is applied to a two-cycle engine having two cylinders will be described hereinbelow with reference to FIGS. 4 to 9.

Figure 1:
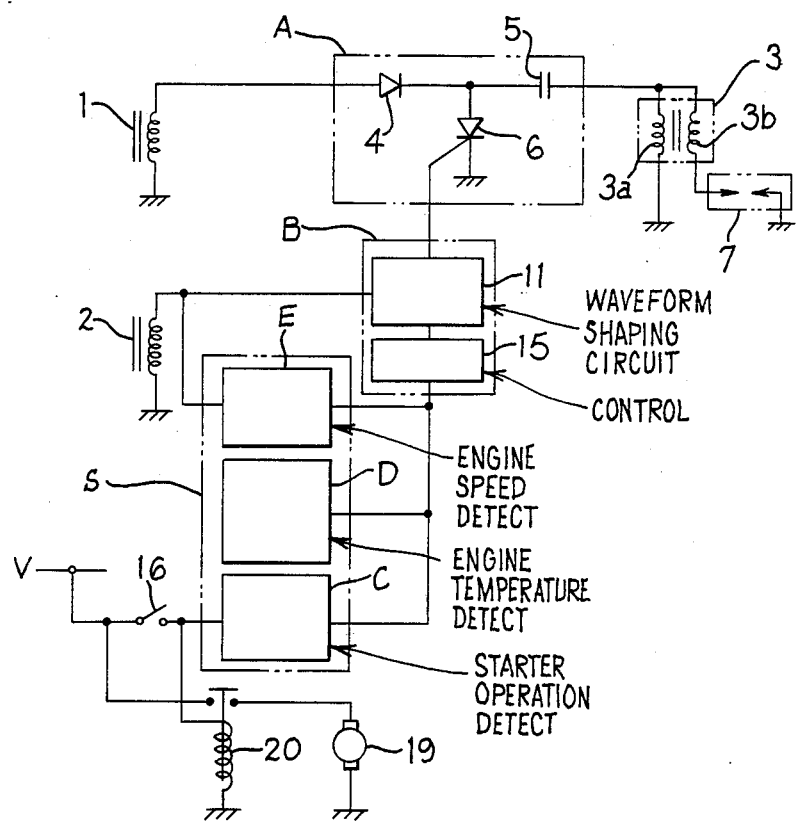
FIG. 1 is a schematic circuit diagram showing an example of a conventional electrical spark advance control mechanism.
Figure 2:
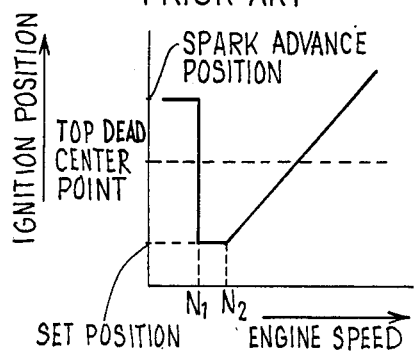
FIG. 2 is a graph showing the ignition position characteristic of the conventional electrical spark advance control mechanism of FIG. 1.
Figure 3:
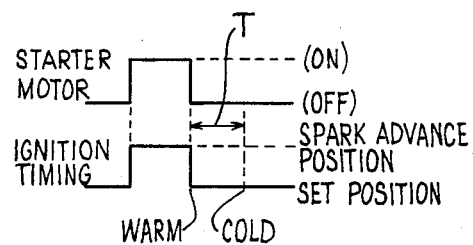
FIG. 3 is a timing diagram illustrating a feature of the spark advance control of the conventional electrical spark advance control mechanism of FIG. 1.
Figure 4:
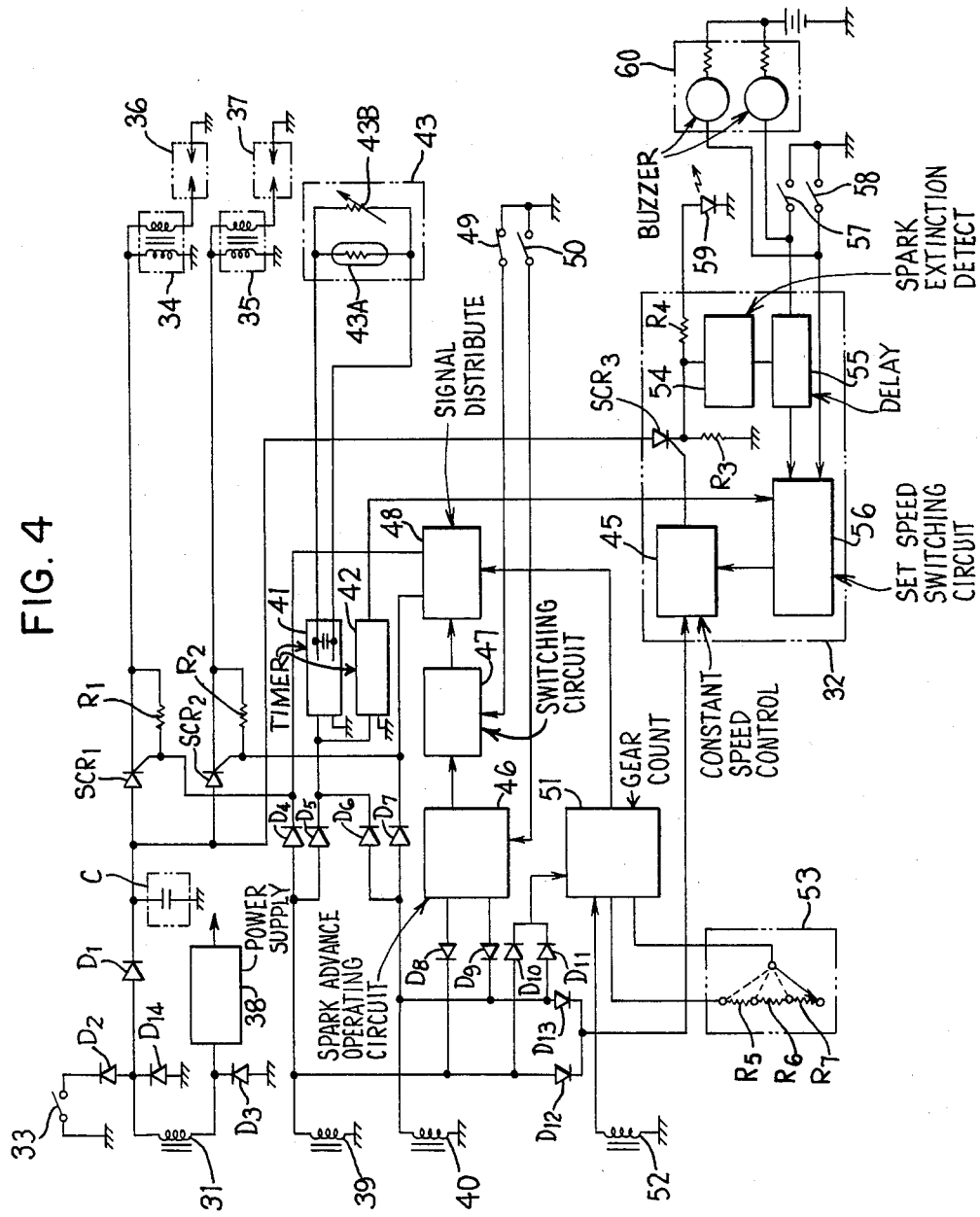
FIG. 4 is a schematic circuit diagram showing a spark advance control mechanism embodying the present invention.
Figure 5:
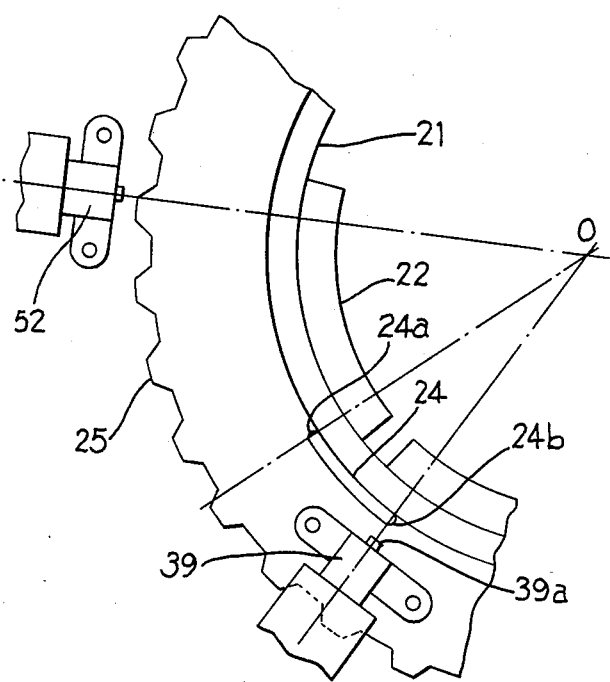
FIG. 5 is a diagram showing the positional relationship of a rotor with respect to a pulser coil and a gear counting coil which are components of the circuit of FIG. 4.

FIG. 4 shows a circuit diagram of an embodiment of the invention. FIG. 5 is a diagram showing the positional relationship of a magnet rotor and a pulse coil and a gear counting coil which facilitate determination of an ignition timing.

In FIG. 5, reference numeral 21 denotes an iron ring guide serving as a base of the rotor. Main magnets 22 are attached to the inside of the iron ring guide 21. Numeral 39 denotes a pulser coil. A trigger pole 24 having therein a magnet is attached to the outside of the iron ring guide 21. When a core unit 39a of the pulser coil 39 faces the end portion of the trigger pole 24 during the rotation of the rotor, the pulser coil 39 generates a predetermined output signal on the basis of a change in magnetic fluxes. The output signal is set to a pulser coil signal "−" of negative polarity as one end portion 24a of the trigger pole 24 passes and is set to a pulser coil signal "+" of positive polarity as the other end portion 24b passes. The number and arrangement of the pulser coils 39 differ in dependence on the number of cylinders. Since the present embodiment is an engine of two cylinders, two pulser coils are provided as will be explained hereinafter.

Numeral 25 denotes a ring gear. The teeth of the ring gear 25 are formed at regular intervals around the outer peripheral surface of the iron ring guide 21. A gear counting coil 52 is arranged near the outside of the ring gear 25 at a distance which provides a small air gap. The gear counting coil 52 has a magnet therein and generates electrical pulses in correspondence to the concave and convex portions of the tooth portion of the iron ring gear 25. The number of pulses generated per rotation of the rotor by the gear counting coil 52 is determined by the number of whole teeth of the ring gear 25. Therefore, a specific change in crank shaft angle can be measured by counting the output pulses of the gear counting coil 52 following an output of the pulser coil 39 serving as a start signal.

Although not shown in FIG. 5, a capacitor charging coil 31 (FIG. 4) to charge a capacitor of an ignition apparatus of the capacitor discharge type, a battery charging coil to charge a battery, and the like are fixed to a crank casing so as to face the magnets 22 in the inside of the iron ring guide 21.

In FIG. 4, one end of the capacitor charging coil 31 is connected to the anodes of diodes $D_1$ and $D_2$. The cathode of the diode $D_1$ is connected to a capacitor C, the anodes of thyristors $SCR_1$ and $SCR_2$, and the anode of a thyristor $SCR_3$ of a rev-limiter 32 (limiter for rotation of a power generator). The cathode of the diode $D_2$ is grounded through a stop switch 33. When the stop switch 33 is turned on, the output of the capacitor charging coil 31 is short-circuited, thereby suppressing all sparks for the spark plugs. The other end of the capacitor C is grounded, thereby enabling the output of the coil 31 to charge it. The cathodes of the thyristors $SCR_1$ and $SCR_2$ are connected to the primary sides of ignition coils 34 and 35. Spark plugs 36 and 37 are connected to the secondary sides of the ignition coils 34 and 35, respectively. Further, the cathode of the thyristor $SCR_3$ is grounded through a resistor $R_3$. The thyristor $SCR_3$ is provided to restrict the rotation when the engine overruns or is in a warning state. When the rotational speed of the engine is above a set speed, the thyristor $SCR_3$ suppresses selected spark for the spark plugs by effectively short-circuiting the output of the capacitor charging coil 31, thereby suppressing an increase in engine speed. A power supply circuit 38 to drive a spark advance operating circuit 46 and the like, which will be explained hereinafter, is connected to the other end of the coil 31.

Pulser coils 39 and 40 are provided in the two-cylinder engine and are each connected at one end to the gate of a respective one of the thyristors $SCR_1$ and $SCR_2$ through diodes $D_4$ and $D_7$, respectively. The other ends of the pulser coils 39 and 40 are grounded. The pulser coils 39 and 40 function as the first ignition signal output means. Voltage adjusting resistors $R_1$ and $R_2$ are connected between the gates and the cathodes of the thyristors $SCR_1$ and $SCR_2$, respectively. The thyristors $SCR_1$ and $SCR_2$ are alternately turned on by the output pulses of the pulser coils 39 and 40, thereby allowing successive charges stored in the capacitor C to be discharged. Further, the outputs of the pulser coils 39 and 40 are connected through respective diodes $D_5$ and $D_6$ to both inputs of two timers 41 and 42.

A temperature sensor 43A, consists of a thermistor or the like embedded in the cylinder wall or the like of the engine, and a variable resistor 43B are connected in parallel with each other and to the timer 41, thereby constituting set time change control means 43 which can automatically adjust a set time of the timer 41.

The timer 41 functions as the first ignition setting means and bypasses the outputs of the pulser coils 39 and 40 so they are not input to the gates of the thyristors $SCR_1$ and $SCR_2$ after the elapse of its predetermined period of time. The other timer 42 is connected to a set speed switching circuit 56, which will be explained hereinafter, and stops the operation of the switching circuit 56 for a set period of time after the start of the engine.

The spark advance operating circuit 46 has the pulser coils 39 and 40 connected to two of its inputs through diodes $D_8$ and $D_9$, respectively. The output of the operating circuit 46 is connected to the gates of the thyristors $SCR_1$ and $SCR_2$ through a switching circuit 47 and a signal distributing circuit 48.

The spark advance operating circuit 46 receives pulse signals from the pulser coils 39 and 40, performs the arithmetic operations and gives to the gates of the thyristors $SCR_1$ and $SCR_2$ the timing signal whose spark advance was adjusted in accordance with the engine speed.

The signal distributing circuit 48 functions as the second ignition signal output means and distributes the timing signal from the operating circuit 46 to the thyristors $SCR_1$ and $SCR_2$.

Switches 49 and 50 are turned on or off in response to the opening or closing of a throttle valve of a carburetor. The switch 49 functions as the fourth ignition timing setting means and is the totally closed switch which is turned on when the throttle valve is fully closed and which is turned off when it is slightly opened. The switch 50 functions as the third ignition timing setting means and is the fully open switch which is turned on when the throttle valve is set to a predetermined opening degree and holds the ON state while it fully opens.

The switches 49 and 50 are grounded at one end. The other end of the switch 49 is connected to the switching circuit 47 which functions as the second ignition timing setting means. The other end of the switch 50 is connected to the spark advance operating circuit 46. Therefore, when the throttle is fully closed, the switching circuit 47 is made operative by the signal from the switch 49, thereby cutting the timing signal output from the spark advance operating circuit 46. On the contrary, when the throttle is open, a pattern of the arithmetic operation in the operating circuit 46 is changed by the signal from the switch 50 or is changed at the end of the spark advance.

Numeral 51 denotes a gear counting circuit (crank angle detecting circuit). The signal of the gear counting coil 52 is input to the gear counting circuit 51. The signals from the pulser coils 39 and 40 are also input to the gear counting circuit 51 through diodes $D_{10}$ and $D_{11}$. The output of the coil 52 is input to the signal distributing circuit 48 which functions as the second ignition signal output means. Numeral 53 indicates a timing change-over switch which serves as timing switching means and is connected to the gear counting circuit 51. The switch 53 changes resistance values by selecting one or more resistors $R_5$ to $R_7$ which are serially connected, thereby changing the gear count number of the gear counting circuit 51 and enabling the ignition timing to be changed.

Further, the rev-limiter 32 is constituted and functions in the following manner.

The output of a constant speed control circuit 45 is connected to the gate of the thyristor $SCR_3$. Rotation signals are supplied from the pulser coils 39 and 40 through diodes $D_{12}$ and $D_{13}$ to the control circuit 45. When the rotational speed has reached a set speed, the control circuit 45 generates an output to turn on the thyristor $SCR_3$. The output of the coil 31 is effectively short-circuited by the turn-on of the thyristor $SCR_3$ and sparks to the spark plugs 36 and 37 are cut, so that an increase in engine speed is restricted. When the engine speed decreases, no output is generated from the control circuit 45 (the same shall apply when the outputs on the negative sides of the pulser coils 39 and 40 were input). Therefore, the thyristor $SCR_3$ is turned off and the short-circuiting of the output of the coil 31 is terminated. The normal sparks are again generated by the spark plugs 36 and 37, and the engine speed is increased. In this manner, by alternately repeating the foregoing operations, the engine speed is effectively maintained at about the set value.

A spark extinction detecting circuit 54 is connected to the cathode of the thyristor $SCR_3$ and detects the ON state of the thyristor $SCR_3$ and generates an output. This output is input to a timer 55. The output of the timer 55 is connected to the set speed switching circuit 56. The output of the switching circuit 56 is connected to the constant speed control circuit 45. An oil level switch 57 is also connected to the timer 55. A cooling water sensor 58 is connected to he switching circuit 56.

In the circuit section 32 constituted as explained above, when the thyristor $SCR_3$ is turned on and a current flows, the spark extinction detecting circuit 54 detects the ON state of the thyristor $SCR_3$ and generates an output signal. The timer 55 is actuated by this signal and generates a predetermined output signal after the elapse of a set time. In response to this output signal, the set speed switching circuit 56 outputs a control speed switching instruction signal to the constant speed control circuit 45.

When the oil level switch 57 operated, the timer 55 is also made operative and outputs a signal to the switching circuit 56 after the elapse of the set time, thereby enabling the set speed in the constant speed control circuit 45 to be switched.

On the other hand, when the cooling water is not circulated and the cooling water sensor 58 is turned on, the switching circuit 56 operates and switches the set rotational speed in the control circuit 45. In this case, the timer 42 is connected to the switching circuit 56, thereby preventing the switching circuit 56 from responding to the actuation of the sensor 58 for a predetermined period of time immediately after the turn-on of the sensor 58.

A warning lamp 59 consisting of an LED is connected to the cathode of the thyristor $SCR_3$ through a resistor R4. When the thyristor $SCR_3$ is turned on and a current flows therethrough, current flows through the warning lamp 59 to ground, so that the lamp 59 is lit to thereby inform the driver that the rev-limiter 32 is operating.

The rev-limiter 32 is similar in structure and function to a circuit disclosed in co-pending U.S. Ser. No. 750,962 filed July 2, 1985, the disclosure of which is hereby incorporated herein by reference.

The practical operation of the circuit shown in FIG. 4 will now be described hereinbelow.

Figure 6:
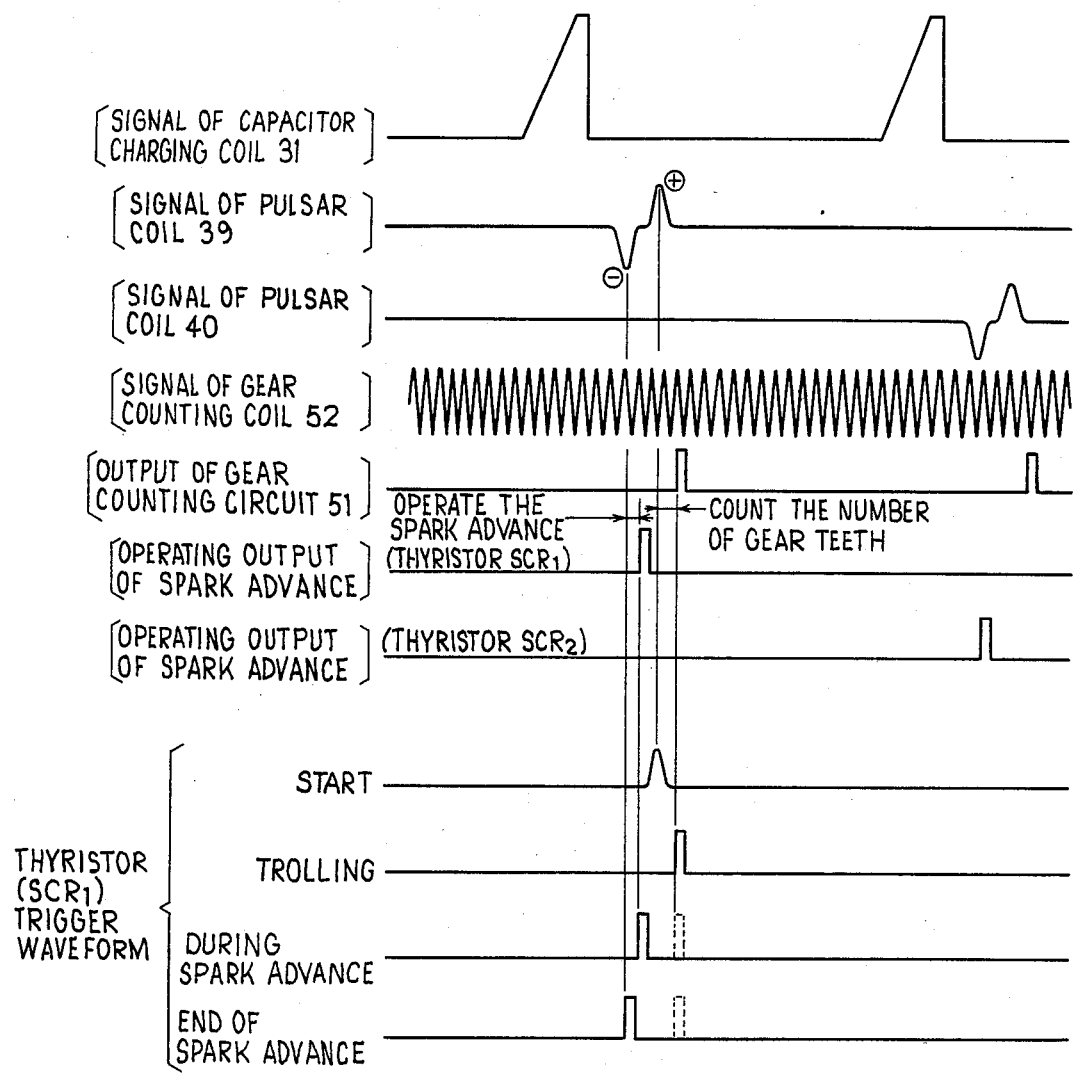
FIG. 6 is a timing diagram showing various waveforms which occur in the circuit of FIG. 4.

(1) Operation of the capacitor C:

A rotor shown in FIG. 5 rotates synchronously with the crank shaft of the engine, so that an output is generated from the capacitor charging coil 31. By the output on the positive side, a current flows along the circuit path consisting of the coil 31→diode $D_1$→capacitor C→ground→diode $D_3$, so that the capacitor C is charged. FIG. 6 shows a waveform diagram of the output of the coil 31 in this case. The output on the negative side of the coil 31 flows along the path consisting of the coil 31→power supply circuit 38→spark advance operating circuit 46 and the like→ground→diode $D_{14}$ and is used as a power source for the operating circuit 46 and the like.

(2) Operation at the start of the engine:

When the rotor (FIG. 5) rotates synchronously with the crank shaft of the engine, the output on the negative side (actually, the first ignition timing signal which is the signal that determines the maximum spark advance) is generated from the pulser coil 39 at the position when one end 24a of the trigger pole 24 attached to the outer peripheral portion of the rotor faces the pulser coil 39. A current flows through the diode $D_8$ to the operating circuit 46. However, since the engine speed at the start of the engine is low in this case, the operation output from the operating circuit 46 denotes a timing which is delayed from the ignition timing at the engine start, which will be explained hereinafter. On the other hand, when the throttle is fully closed, the totally closed side switch 49 of the throttle switch is in the ON state. Therefore, the switching circuit 47 operates and the output (third ignition timing signal) of the spark advance operating circuit 46 is cut and the gates of the thyristors $SCR_1$ and $SCR_2$ are not influenced.

Further, as the rotor rotates further, the other end 24b of the trigger pole 24 comes to face the pulser coil 39 and the output on the positive side (i.e., the first ignition timing signal as the signal to determine the optimum starting spark advance) is generated as shown in FIG. 6. Due to this output, a current flows along the path consisting of the pulser coil 39→diode $D_4$→gate of the thyristor $SCR_1$→cathode of the thyristor $SCR_1$→primary side of the ignition coil 34→ground, thereby turning on the thyristor $SCR_1$. Thus, the charge stored in the capacitor C is discharged along the path consisting of the capacitor C→thyristor $SCR_1$→primary side of the ignition coil 34→ground. A high voltage is generated in the secondary side of the ignition coil 34 and a spark is generated from the spark plug 36, so that the engine is actuated. FIG. 5 shows an example in the case of the two-cylinder type engine. Thereafter, when the rotor then rotates through an angle of 180°, operations similar to the above are executed by the pulser coil 40, thyristor $SCR_2$, ignition coil 35, and spark plug 37. Thereafter, by alternately repeating the foregoing operations, the rotational driving force is derived from the engine.

The ignition timing (the timing of the outputs on the positive sides of the pulser coils 39 and 40) when the sparks are generated at the start of the engine is set to a timing corresponding to a crankshaft position which is 5° to 10° before the top dead center point, at which good starting performance is obtained. This timing will be referred to as a start ignition timing hereinafter.

Since the optimum timing to start the engine is selected as the start ignition timing, it does not coincide with the ignition timing suitable for the trolling mode. The ignition timing in the trolling mode needs to be set to the position which is delayed by a few degrees from the start ignition timing. Therefore, in the invention, when a predetermined period of time has elapsed after the start of the engine, the ignition timing is automatically changed from start ignition timing to the ignition timing for the trolling mode, which will be explained hereinafter. Therefore, for the period of time which is decided by the variable resistance value of the temperature sensor such as the thermistor 43A or the like, the variable resistor 43B and the capacitor of constant value, the operation at the engine start is performed and the sparks are generated 5° to 10° before the top dead center point. After the elapse of this time, the timer 41 expires and by-passes the outputs from the pulser coils 39 and 40.

Figure 7:
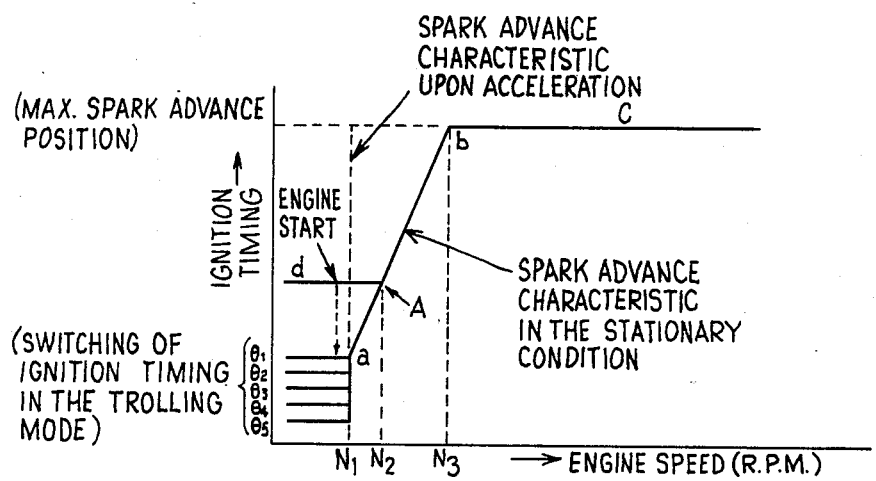
FIG. 7 is a graph showing an ignition timing characteristic of the circuit of FIG. 4.

(3) Operation in the trolling mode:

After the timer 41 has by-passed the outputs of the pulser coils 39 and 40, the following operations are executed. The output of a waveform as shown in FIG. 6 is always generated from the gear counting coil 52 during the rotating operation of the engine. For the period of time which is determined in length by the capacitor of constant value and by the resistance value which was set by the timing change-over switch 53 in the gear counting circuit 51, and which starts in response to the outputs having the waveform on the positive sides of the pulser coils 39 and 40 and serving as start signals, the pulses from the gear counting coil 52 are counted. After completion of the counting operation, an output is generated. The output of the gear counting circuit 51 is converted into the second ignition timing signal for trolling by the signal distributing circuit 48. This signal is supplied to the gates of the thyristors $SCR_1$ and $SCR_2$ to thereby turn on them. Thus, as shown in FIG. 7, sparks are generated at one of the ignition timings $\theta_1$ to $\theta_5$ in the trolling mode, so that the stable trolling rotational speed is obtained.

In this case, the trolling rotational speed needs to be set to an optimum value in accordance with the particular application for the outboard engine, including the shape, weight, and the like of the hull which is used. For this purpose, the signal distributing circuit 48 generates sparks at the positions which are delayed from the positive pulse waveforms of the pulser coils 39 and 40 by a number of degrees of the crankshaft determined by the resistance value selected by switching the change-over switch 53 as the timing switching means to thereby select the number of pulses which are to be counted by the gear counting circuit 51. In this manner, the ignition timings (the second ignition timing signal) can be set and output at intervals of a desired degree. In this case, the set range of the ignition timing is determined by the number of teeth of the ring gear 25 and the range of the resistance value which can be selected by the timing change-over switch 53. The angle range and the delay interval are set to arbitrary values by the design. If the crank angle between two adjacent teeth is large, due to a small number of teeth being provided on the ring gear, it is sufficient that a multiplying circuit is provided for the gear counting circuit 51 so that the count value of the gear counting circuit 51 is multiplied, thereby reducing the angle per count, for example by one-half.

As described above, the ignition timing for trolling is changed by switching the timing change-over switch 53, so that the engine power changes and the trolling rotational speed changes. By attaching the switch 53 near the driver's seat, even when the driver is remote-operating the engine, a desired trolling rotational speed can be easily set by simply operating the switch 53.

As to the set time defining the duration of the start ignition timing, when the engine is cold it is desirable to keep the ignition timing at the start timing position upon starting of the engine until the engine is slightly warmed up. On the other hand, when the engine is already warm, it is desirable to return to the ignition timing for trolling as fast as possible after the start of the engine. Therefore, the set time of the timer 41 is changed by a change in the resistance value of the temperature sensor 43A such as a thermistor or the like embedded in the cylinder or the like. In this manner, the resistance value of the thermistor is increased to increase the timer set time when the engine is cold. The resistance value is decreased to reduce the timer set time when the engine is warm. The range of the set time can be changed by adjusting the resistance of the variable resistor 43B connected in parallel with the temperature sensor 43A. The set time change control means 43 is constituted by the temperature sensor 43A and variable resistor 43B.

(4) Operation at a middle speed:

When the engine speed is raised by slightly opening the throttle from the trolling state, the totally closed switch 49 of the throttle switch is turned off. When the engine speed exceeds the value $N_1$ shown in FIG. 7, the engine is set into this state and the switching circuit 47 is turned on. The operating output calculated in accordance with the periods of the negative side outputs, as the references, of the pulser coils 39 and 40 from the spark advance operating circuit 46 (i.e., the third ignition timing signal) is input to the gates of the thyristors $SCR_1$ and $SCR_2$ along the path consisting of the switching circuit 47→signal distributing circuit 48. The thyristors $SCR_1$ and $SCR_2$ are turned on. The operating circuit 46 performs the arithmetic operation so as to give a large delay to the output when the pulse period is long, thereby providing the ignition timing characteristic such that the ignition timing gradually advances with an increase in engine speed.

This operation is continuously performed until the end of the spark advance, namely for the period of time of "a→b" in FIG. 7, or in other words until maximum spark advance is in effect. Sparks are generated at the ignition timing which is determined by the operating output of the spark advance.

After completion of the spark advance, the engine is set into the state c in FIG. 7 and sparks are generated at an ignition timing which is directly triggered by the negative outputs of the pulser coils 39 and 40, as shown in FIG. 7. In this state, the ignition timing is maintained in the maximum spark advance state irrespective of the engine speed, and is held almost constant so that almost a flat characteristic is derived.

On the other hand, when the rotational speed is raised before the end of the operation of the timer 41 during the start ignition timing state after the start of the engine, the characteristic of the ignition timing at the start of the engine, which is indicated by d in FIG. 7, crosses the characteristic of the ignition timing which is determined by the output of the operating circuit 46 at point A in FIG. 7. The output of the operating circuit 46 takes precedence after the point A. Thus, the ignition is performed in accordance with the characteristic of A→b→c. Therefore, even if the engine speed was raised from the moving spark advance state, the spark advance is normally performed and no problem occurs.

Figure 8:
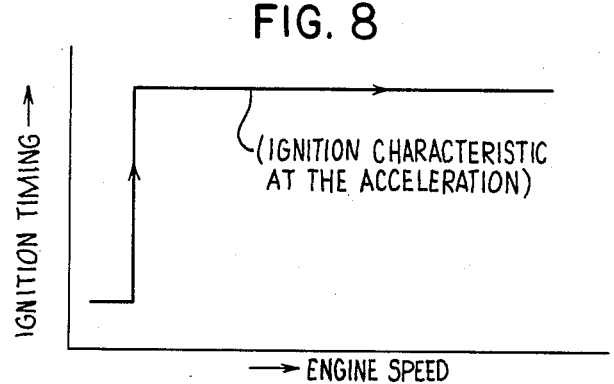
FIG. 8 is a graph showing an ignition timing characteristic of the circuit of FIG. 4 at the time of acceleration.

(5) Operation in the rapid accelerating mode:

The ignition timing characteristic in the case of increasing the engine speed by gradually opening the throttle is as shown in FIG. 7 as mentioned before. However, when the throttle was suddenly opened for rapid acceleration, the full opening switch 50 of the throttle switch is turned on, so that the arithmetic operation of the operating circuit 46 is inhibited. The thyristors $SCR_1$ and $SCR_2$ are soon turned on by the negative side outputs of the pulser coils 39 and 40. Therefore, the ignition timing characteristic becomes as shown in FIG. 8. When the switch 50 is turned on, the ignition timing is instantaneously set to the maximum spark advance position, thereby eliminating the slow increase in engine speed. The drive feeling with the acceleration feeling is obtained. The switch 50 is also turned on at a certain opening degree of the throttle when the throttle is gradually opened. However, in this case, since the ignition timing has already been set to the maximum spark advance position by the operation of the operating circuit 46, the engine is not influenced even if the switch 50 is turned on.

Figure 9:
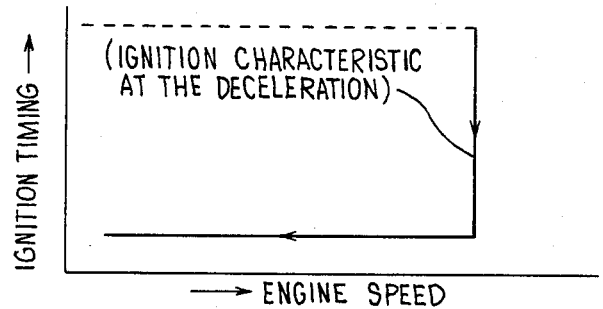
FIG. 9 is a graph showing an ignition timing characteristic of the circuit of FIG. 4 at the time of deceleration.

(6) Operation in the sudden totally closed state:

When the throttle valve is suddenly fully closed from the full opening state of the throttle, the totally closed side switch 49 of the throttle switch is turned on. Thus, the switching circuit 47 operates to cut the output from the operating circuit 46. The thyristors $SCR_1$ and $SCR_2$ are turned on by the output signal from the gear counting circuit 51. When the switch 49 is turned on, the ignition timing is instantaneously set into the timing in the trolling mode, as shown in FIG. 9. Therefore, the ignition timing is promptly shifted from the maximum spark advance position to the trolling ignition timing and the engine speed is smoothly reduced for the minimum time.

On the other hand, since the switch 49 is also normally ON in the trolling mode, even if the trolling rotational speed fluctuated independently of the throttle and reached the output generation rotational speed of the operating circuit 46, stable ignition timing can be obtained without being influenced by it.

(7) Operation of the rev-limiter:

In many cases, the life of the engine is reduced due to the fact that the engine speed abnormally rises because of the occurrence of a cavitation phenomenon in which air is inhaled into the propeller duct during running, the engine speed abnormally increases when the throttle is fully open because of a small pitch of the propeller, or the like. To prevent the occurrence of such a situation, there is provided the rev-limiter 32 which functions to prevent excessive engine speed by cutting the ignition when the engine speed attempts to exceed a predetermined level.

When the engine is operating, the outputs of the pulser coils 39 and 40 are supplied through the diodes $D_{12}$ and $D_{13}$ to the constant speed control circuit 45. The control circuit 45 detects the engine speed by the number of pulses per unit of time. When the engine speed reaches a set rotational speed (e.g., 6000 r.p.m.), the control circuit 45 generates an output to the gate of the thyristor $SCR_3$ to thereby turn on the thyristor $SCR_3$. Due to the turn-on of the thyristor $SCR_3$, the output of the capacitor charging coil 31 flows along the circuit path consisting of the diode $D_1 \rightarrow$ thyristor $SCR_3 \rightarrow$ ground $\rightarrow$ diode $D_3$ and the output of the coil 31 is short-circuited, so that one or more sparks are suppressed. Thus, the engine power decreases and the engine speed is reduced. When the rotational speed decreases, the output from the constant speed control circuit 45 disappears and the thyristor $SCR_3$ is turned off. The ignition is then performed normally again, the engine power is returned to normal, and the engine speed increases again. By repeating these operations, the engine speed is held to substantially a constant value near the set value.

However, when this state is continued as it is, the fluctuation of torque increases, causing the life of the engine to be detrimentally reduced. To prevent this, the voltage drop across the resistor $R_3$ arranged between the thyristor $SCR_3$ and ground is monitored by the spark extinction detecting circuit 54. When a voltage is detected, a signal is given to the timer 55. When the timer 55 detects the continuation of this signal for a predetermined period of time, it generates an output signal and supplies it to the set speed switching circuit 56. The switching circuit 56 then supplies a set speed switching signal to the constant speed control circuit 45. In response to this signal, the control circuit 45 changes the set rotational speed to a second set speed which is lower (e.g., 3000 r.p.m.). In a manner similar to the above, the control circuit 45 turns on or off the output to the gate of the thyristor $SCR_3$ using the second set speed as a reference. Thus, the engine speed is then maintained at a speed near 3000 r.p.m.

When the engine speed is continuously restricted to 6000 r.p.m., the speed drops to 3000 r.p.m. after the elapse of a predetermined period of time. Therefore, the engine is protected and, at the same time, the overspeed of the engine can be actively indicated to the driver. Further, by use of the voltage drop across the resistor $R_3$, a current is supplied to the warning lamp 59 consisting of an LED so as to light the lamp 59, thereby enabling the spark suppression state to be also visually indicated to the driver.

In association with the rev-limiter 32, the engine oil level and the presence or absence of the cooling water of the water cooled outboard engine are detected. In the case of the oil, when the oil level reaches a warning level, a sensor detects it. In the case of the cooling water, when the water does not circulate in the engine jacket, a sensor detects it. Then, the engine speed is restricted to the second set speed.

If the oil level decreases to the warning level during operation of the engine at a speed above the second set speed, the oil level switch 57 is turned on, and the timer 55 is made operative and after elapse of a predetermined period of time generates an output signal to the set speed switching circuit 56. In response to this signal, the switching circuit 56 outputs a speed switching signal to the constant speed control circuit 45. Then, a signal is output from the control circuit 45 to the gate of the thyristor $SCR_3$, so that the thyristor $SCR_3$ is turned on. Sparks are suppressed by the turn-on of the thyristor $SCR_3$, and the engine speed decreases to the second set speed (3000 r.p.m.). The engine is thus protected, the fact that the oil has reached the warning level is indicated to the driver and, at the same time, the warning lamp 59 is lit to warn the driver.

Similarly, when the cooling water in the jacket is not circulated during operation of the engine at a speed above the second set speed, the cooling water sensor 58 is turned on. The set speed switching circuit 56 is actuated and outputs a set speed switching signal. In response to this signal, the control circuit 45 generates an output signal to the gate of the thyristor $SCR_3$, so that the thyristor $SCR_3$ is turned on and sparks are suppressed. The engine speed decreases to the second set speed (3000 r.p.m.), thereby informing the driver that the cooling water is not circulating in the jacket. At the same time, the warning lamp 59 is lit to warn the driver.

When an abnormal condition of the oil level or cooling water occurs, the engine speed is restricted. Namely, in the case of the oil level, the restricting operation of the engine speed is performed following the elapse of a predetermined period of time after the oil level switch 57 is turned on. In the case of the cooling water, the restricting operation of the engine speed is started simultaneously with the turn-on of the cooling water sensor 58. As shown in FIG. 4, by making a buzzer 60 operative in response to the turn-on of the oil level switch 57 or cooling water sensor 58, the driver can know that the switch 57 or sensor 58 was turned on. Therefore, a determination of which one was actuated can be made by checking whether the restricting operation of the engine speed was started after the elapse of the predetermined period of time or immediately after the turn-on.

The timer 42 connected to the pulser coils 39 and 40 functions in the following manner.

The cooling water sensor 58 is turned on when the cooling water does not flow. However, a certain time is required at the engine start before the cooling water pumped by a water pump attached in a gear casing circulates in the cylinder jacket and other portions and reaches the cylinder head or the cooling water sensor 58 attached near the cylinder head. It is usually desirable for the driver to set the operating mode into the running mode only after confirming that the cooling water was circulated in the jacket after the start of the engine. By doing this, no problem will occur. However, if the driver must suddenly increase the rotational speed immediately after the engine was started, for example if the driver desires to avoid a danger such as a collision or the like, the engine speed is raised before the cooling water reaches the sensor, so that the speed is limited to the second set speed by spark suppression. In this case, by suppressing sparks, the engine speed is not raised to a value above 3000 r.p.m., so that the sufficient running state cannot be accomplished and the object to avoid the danger cannot be attained.

Therefore, when the outputs of the pulser coils 39 and 40 are input to the timer 42 upon the start of the engine, the operation of the set speed switching circuit is stopped by the timer 42 for a predetermined period of time (this time is set to be slightly longer than the time required for the cooling water to reach the sensor). Due to this, even if the operating mode is set to the running mode just after the start of the engine, the driving operation can be performed without causing any problem. In this case, if the cooling water is not circulated, the restricting of the engine speed is started immediately after the elapse of the set period of time of timer 42.

As described above, in the ignition apparatus in the preferred embodiment, the ignition timing upon starting of the engine is set to the optimum start ignition timing by the pulser coils, so that a very good starting characteristic can be obtained. In the trolling mode, the ignition timing is set to a timing which is delayed by a predetermined angle from that at the engine start, so that trolling is stably performed. In the running mode, the ignition is performed in accordance with an ignition timing characteristic such that the spark advance is increased (up to a maximum limit) with an increase in rotational speed, so that the engine speed is smoothly increased. When the engine speed is raised just after the start of the engine, the ignition timing is soon set to the spark advance characteristic for the running mode, so that the engine is not adversely influenced.

On the other hand, in a rapid accelerating mode, the ignition timing is immediately set to the timing which is advanced from that in the stationary state, so that good accelerating performance is obtained. In the rapid deceleration mode, the ignition timing is immediately set to the delayed spark state, so that good decelerating performance is derived.

Further, since the ignition timing in the trolling mode can be selectively varied by the timing change-over switch, the engine speed can be easily adjusted to the optimum trolling rotational speed in accordance with the driving state. By attaching the change-over switch near the driver's seat, the driver can easily adjust the ignition timing during the driving by operating this switch.

Further, in the ignition apparatus in the preferred embodiment, when the cooling water is not circulated, the engine speed is restricted to a low speed, so that an adverse influence on the life of the engine is prevented. In this case, since the restricting operation of the engine speed is not performed for a set period after the start of the engine, the engine speed can be raised for the interval when the circulation of the cooling water in the cylinder portion is started. Therefore, the invention can also cope with an accidental situation such as avoidance of a collision or the like.

In the preferred embodiment, the gear counting system to detect the number of teeth of the ring gear by the coil has been described as the means for detecting the crank angle of the engine. However, the invention is not limited to the ring gear but may be also applied to a ring-shaped rotary member made of a magnetic material having the proper number of concave and convex portions which rotate interlockingly with the engine.

As described above, according to the invention, it is possible to realize an electrical spark advance apparatus having excellent durability because its structure is simpler and it does not have a slide portion, as compared with the conventional mechanical spark advance apparatus.

In the ignition apparatus of the invention, the ignition timing at the start of the engine is advanced by a predetermined angle, so that the good starting characteristic can be obtained without setting the ignition timing to an abnormally early timing. Thus, acceleration just after the start of the engine can be smoothly performed.

According to another feature, a set time change control means is provided for the ignition apparatus. Therefore, when the engine cylinder is warm, a timing signal is not necessarily advanced. Therefore, there is an effect such that the set time of the spark advance state used when the engine cylinder is cold is reduced to a shorter time, thereby making it possible to shift to the trolling mode in a short time.

According to a further feature, timing switching means for the second ignition signal output control means is coupled to the second ignition signal output means. Therefore, the ignition timing in the trolling mode can be switched and set to an arbitrary position on the basis of the judgment of the particular situation by the operator. Accordingly, if this timing switching means is attached to the dashboard or the like, the ignition timing can be fairly easily changed even during the driving.

According to yet another feature, the first ignition timing signal is also used as the signal to determine the maximum spark advance, the operation of the spark advance operating circuit is stopped at an emergency acceleration of the engine, and there is further provided third ignition timing setting means for leading, switching, and using the signal to determine the maximum spark advance as the first ignition timing signal in order to set the ignition timing. Therefore, there is an advantage such that good accelerating performance is obtained because in the case of the emergency acceleration, the spark advance characteristic is immediately advanced from that in the stationary state.

According to still another feature, fourth ignition timing setting means is provided, and in the case of an emergency deceleration of the engine, the second ignition timing signal is switched and used as the signal to set the ignition timing in place of the third ignition timing signal which is output from the spark advance operating circuit. Therefore, at the emergency deceleration of the engine, the ignition timing is immediately delayed, so that the ignition apparatus having excellent attenuating performance can be obtained.

Figure 10:
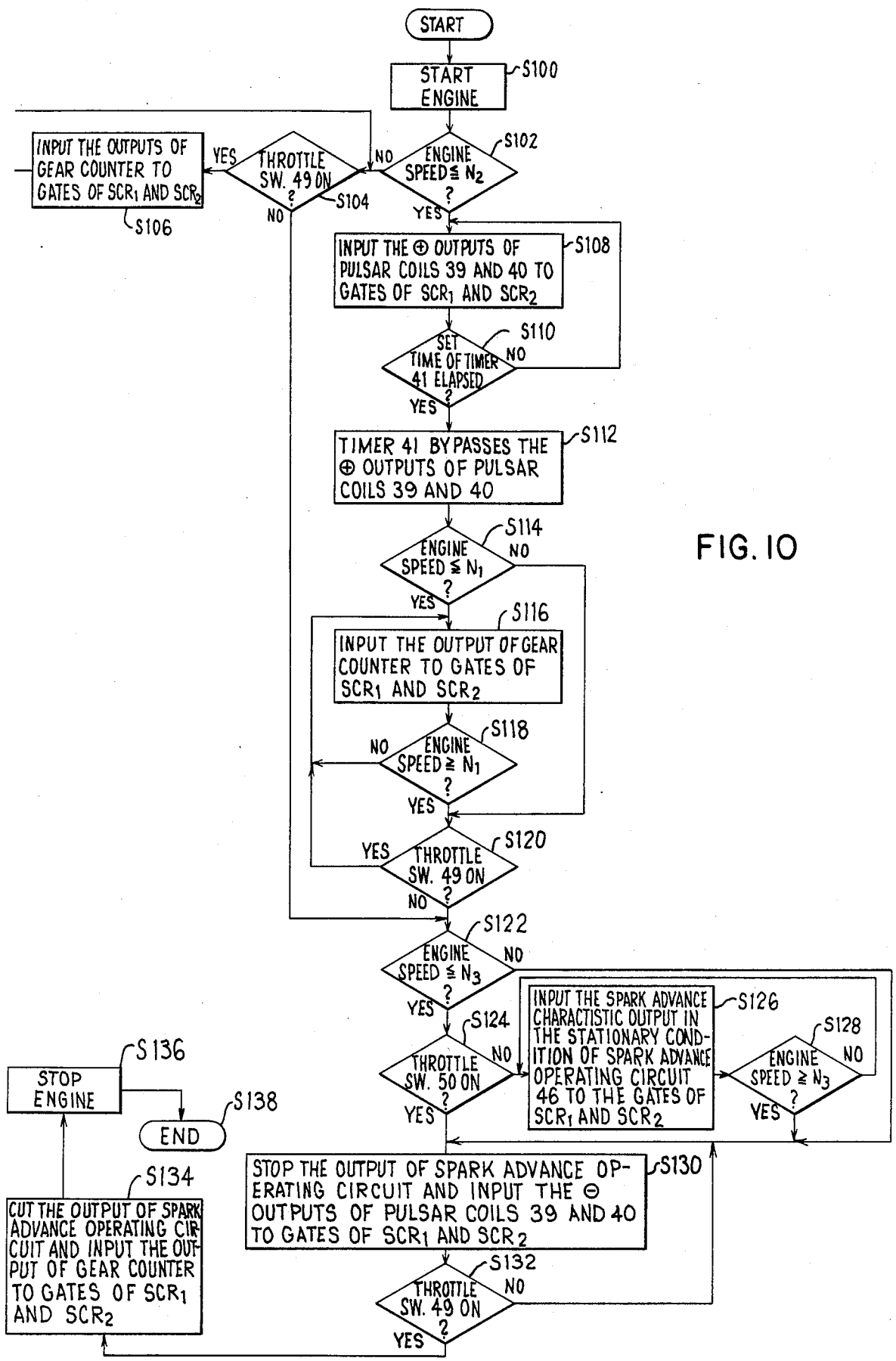
FIG. 10 is a flowchart showing the operational control effected by a spark advance operating circuit which is a component of the circuit of FIG. 4.

The spark advance operating circuit 46 and switching circuit 47 can be implemented with a conventional and commercially available microprocessor, for example an Intel 8080 which is manufactured by Intel Corporation of Santa Clara, Calif. FIG. 10 is a flow diagram of the program for such microprocessor. The flow diagram basically implements the control operations which have already been described, and it should therefore not be necessary to describe it in detail here.

Although the present invention has been shown and described with respect to a preferred embodiment, various changes and modifications which are obvious to a person skilled in the art to which the invention pertains are deemed to lie within the spirit and scope of the invention.

The embodiments of the invention in which an exclusive property or privilege is claimed are defined as follows:

1. An ignition apparatus for an engine having a crankshaft, comprising:

first ignition signal output means for outputting a first ignition timing signal having a predetermined spark advance synchronously with the rotation of the engine;

second ignition signal output means for outputting, as a signal for trolling, a second ignition timing signal which is delayed from the first ignition timing signal from said first ignition signal output means by a time interval representing the time required for the crankshaft to rotate through a predetermined angle;

a spark advance operating circuit for performing an arithmetic operation on the basis of the output of said first ignition signal output means and for outputting a third ignition timing signal which respectively advances and delays an ignition timing in response to an increase and decrease in the rotational speed of the engine;

first ignition timing setting means for using said first ignition timing signal as a signal to set the ignition timing for a selected period of time after the start of the engine and for switching to use of said second ignition timing signal as a signal to set the ignition timing after elapse of said selected period of time;

second ignition timing setting means which is immediately made operative when the engine is accelerated before the expiration of said selected period of time after the start of the engine for switching to use said third ignition timing signal as a signal to set the ignition timing; and third ignition timing setting means which is immediately made operative when the engine is suddenly decelerated and which switches and uses the second ignition timing signal as a signal to set the ignition timing in place of said third ignition timing signal.

2. An ignition apparatus of claim 1, including set time change control means for setting said selected period of time when said first ignition timing signal is used to a first interval and to a second interval longer than said first interval where a cylinder of the engine is respectively warm and cold, said set time change control means being coupled to said first ignition timing setting means.

3. An ignition apparatus of claim 1, including timing switching means for defining a plurality of different delay times and for permitting one of said delay times to be arbitrarily selected by an operator, said timing switching means being coupled to said second ignition signal output means and said time interval by which said second ignition timing signal is delayed from said first ignition timing signal being said selected delay time.

4. An ignition apparatus of claim 1, wherein said first ignition timing signal serves as a signal to determine an optimum start ignition timing and as a signal to determine a maximum spark advance synchronized to the rotation of the engine; and including fourth ignition timing setting means for stopping the operation of said spark advance operating circuit when the engine is suddenly accelerated and for switching and using the first ignition timing signal to determine the maximum spark advance as a signal to set the ignition timing.

* * * * *